United States Patent [19]
Ferrer et al.

[11] 3,917,696
[45] Nov. 4, 1975

[54] DIHALOGEN-ACETAMINO-BENZYLAMINES AND PROCESS FOR PREPARING THE SAME

[75] Inventors: Carlos Ferrer; Juan Colome, both of Barcelona, Spain

[73] Assignee: Laboratories Ferrer S.1., Barcelona, Spain

[22] Filed: Sept. 20, 1974

[21] Appl. No.: 507,989

[52] U.S. Cl. .............................. 260/562 R; 424/320
[51] Int. Cl.² ...................................... C07C 103/34
[58] Field of Search ................................ 260/562 R

[56] References Cited
UNITED STATES PATENTS
3,108,038  10/1963  Fielding et al. ................ 260/562 R
3,852,058  12/1974  Huffman ........................ 260/562 R

*Primary Examiner*—C. Davis
*Attorney, Agent, or Firm*—Michael S. Striker

[57] ABSTRACT

The invention relates to novel dihalogen-acetamino-benzylamines having the formula

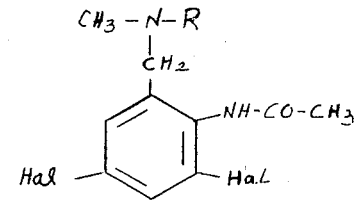

wherein Hal is halogen and R is a cyclohexyl or an adamantyl group and the pharmaceutically acceptable acid addition salts thereof. Further the invention comprises the process for the manufacture of the new compounds by reacting 1-bromomethyl-3,5-dihalo-N,N-diacetylaniline with N-methyl-adamantine or N-methyl-cyclohexylamine.

The novel compounds are possessed of spasmolytic and antitussive activity.

7 Claims, No Drawings

DIHALOGEN-ACETAMINO-BENZYLAMINES AND PROCESS FOR PREPARING THE SAME

The present invention relates to new diahlogen-acetamino-benzylamines of the formula:

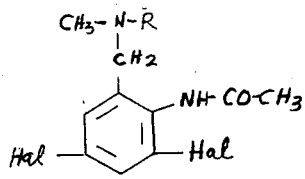

wherein Hal is halogen and preferably bromine or iodine and R is an adamantyl or cyclohexyl group and the pharmaceutically acceptable acid addition salts thereof, preferably the hydrochloride salt.

It has now been found that the present compounds can be prepared most advantageously by reacting 1-bromomethyl 3,5-dihalo-N,N-diacetyl-aniline, wherein Hal is preferably bromine or iodine, with N-methyl-adamantine or N-methyl-cyclohexylamine dissolved in absolute ethanol under reflux for about 8 hours. The absolute ethanol is thereafter eliminated and the residue washed several times with ethyl ether. The resulting solid product is treated with 150 ml of 2N HCl under reflux for 2 hours, cooled and kept at a temperature of 4°C for about 8 to 12 hours. The crystalline solid thus obtained is washed with abundant distilled water and the resulting product is recrystallized in a mixture of acetic acid and water (2:1 v/v).

The compounds according to the invention are possessed of excellent spasmolytic and antitussive activity.

The in vitro spasmolytic activity was evaluated on isolated trachea of guinea pig and rat by provoking the spasm with different antagonistic agents, such as histamine, serotonine and barium chloride. The results of these experiments are shown in Table I which follows:

of the test compound and amounted to 37.5% on acetylcholine (i.v.) and 66.5% on histamine (i.v.).

The $LD_{50}$ of N-(3,5-diiodo-2-acetaminobenzyl)-N-methyl-cyclohexylamine in mouse by i.p. route was 260 mg/kg.

The following compounds were further evaluated:
1. N-(3,5-diiodo-2-acetaminobenzyl)-N-methylcyclohexylamine hydrochloride
2. N-(3,5-diiodo-2-acetaminobenzyl)-N-methyladamantine hydrochloride
3. N-(3,5-dibromo-2-acetaminobenzyl)-N-methyladamantine hydrochloride and the results hereinafter set out were obtained:

Pharmacological properties.

As is well known mucous hypersecretion from mucoporous cells and glands is developed in inflammatory processes involving the bronchial tubes and branches thereof. This secretion has a high viscosity due to the physicochemical modifications on its mucopolysaccharide component and, on being retained, can provoke bronchial obstruction together with a diminution of pulmonary expandibility, increase of breathing effort and persistent coughing spells.

The administration of the compounds of the invention provided a diminution in the mucous production, and fluidification of the same which resulted in a diminution of the sputum viscosity by fragmentation of the mucopolysaccharide fibres of mucous.

Therapeutical indications.

The compounds of the invention are clearly indicated in mucous hypersecretion in chronic and acute bronchopneumopathies (chronic bronchitis, bronchial asthma, acute bronchitis, pulmonary emphysema).

Posology.

The new compounds may be applied as drugs, for example in the form of pharmaceutical preparations. For that purpose they are mixed with one or more pharma-

TABLE I

| | in vitro spasm reduction rate on isolated trachea of guinea pig and rat | | | | |
|---|---|---|---|---|---|
| Product | Antagonist Dose mM/ml | Histamine $27\times10^{-5}$ mM/ml | Serotonine $86\times10^{-6}$ mM/ml | Barium chloride $48\times10^{-6}$ mM/ml | Acetylcholine |
| N-(3,5-diiodo-2-acetaminobenzyl N-methyladamantine hydrochloride | $47\times10^{-8}$ | | 33.38 | | |
| | $94\times10^{-8}$ | | 62.25 | | |
| | $189\times10^{-8}$ | | 76.73 | | |
| | $15\times10^{-6}$ | | | 35.33 | |
| | $30\times10^{-6}$ | | | 54.33 | |
| | $61\times10^{-6}$ | | | 73.96 | |
| | $121\times^{-6}$ | 19.12 | | | |
| | $242\times10^{-6}$ | 34.88 | | | |
| | $485\times10^{-6}$ | 54.74 | | | |
| N-(3,5-dibromo-2-acetaminobenzyl)-N-methyladamantine hydrochloride | $61\times10^{-6}$ | | | | |
| | $121\times10^{-6}$ | 13.39 | | 33.90 | |
| | $242\times10^{-6}$ | 21.67 | 31.20 | 50.80 | |
| | $485\times10^{-6}$ | 30.99 | 46.70 | 66.03 | |
| | | | 63.00 | | |
| N-(3,5-diiodo-2-acetaminobenzyl)-N-methyl-cyclohexyl hydrochloride | $30\times10^{-6}$ | — | 22.93 | | — |
| | $61\times10^{-6}$ | 16.27 | 43.53 | | — |
| | $121\times10^{-6}$ | 27.05 | 63.73 | | — |
| | $242\times10^{-6}$ | 48.18 | — | | — |

The in vivo activity of the N-(3,5-diiodo-2-acetaminobenzyl-N-methyl-cyclohexyl hydrochloride was estimated on bronchospasm induced by histamine (5 mg/ml/kg), serotonine (5 mg/ml/kg) and acetylcholine (65 mg/ml/kg) in guinea pigs previously anesthetized with ethylurethane (1.5 - 1.7 g/kg, i.p.) using a dose of 5.3 mg/2 ml/kg. The spasmolysis is reported in terms of inhibition rate with regard to the value of the bronchospasm prior to the administration ceutical vehicles suitable for oral administration, or with liquid or solid auxiliaries, such as water, benzylalcohol, propylene glycol, polyalkylene glycols, vegetable oils, gelatin, starch, lactose and magnesium stearate. The preparations may be shaped into tablets, coated tablets, grains, pills or capsules, or they may occur in liquid form, such as solutions, emulsions or suspensions. Furthermore they may be used in the form of suppositories. They may also contain the required auxiliaries, such as fillers, lubricants, preservatives and emulsifying agents, and are prepared by any method known per se. Per dosage unit they contain for example 1–10 mgrams of the active substance dependent upon the way in which they are to be administered, as well as the nature and the degree of the biological activity. Thus, for example, the daily dosage may vary from 15–100 mgrams. Preferably tablets or a syrup containing the compounds of the invention are employed.

The compounds may also be applied for external use by introducing them into a spray together with a suitable propellant and, if desired, a solvent.

The invention is illustrated by the following examples but is in no wise to be construed as limited thereby:

EXAMPLE 1

(Preparation of
N-(3,5-diiodo-2-acetomino-benzyl)-N-methyladamantine hydrochloride of formula):

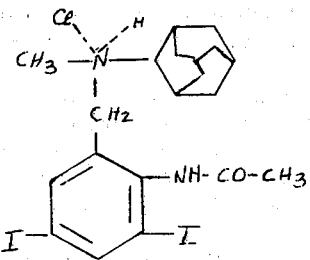

5.25 g of 1-bromomethyl-3,5-diiodo-N,N-diacetyl-aniline were reacted with 1.650 g of N-methyladamantine which had previously dissolved in 100 ml of absolute ethanol and the mixture refluxed for 8 hours. The ethanol was then evaporated and the residue washed several times with ethyl ether. The solid product which formed was then reacted with 150 ml of HCl for 2 hours and the resulting product cooled and kept at 4°C for 10–12 hours. The crystalline solid which was thus obtained was filtered and washed with abundant distilled water. The product could be recrystallized from a mixture of water and acetic acid (2:1 v/v).

The final product thus obtained, N-(3,5-diiodo-2-acetaminobenzyl)-N-methyladamantine hydrochloride is a crystalline white powder of M.W. 600.70 and M.P. (Köfler) 223°–226°C. maximum U.V. spectrum at 228 m.

EXAMPLE 2

(Preparation of
N-(3,5-dibromo-2-acetaminobenzyl)-
N-methyladamantine hydrochloride of formula):

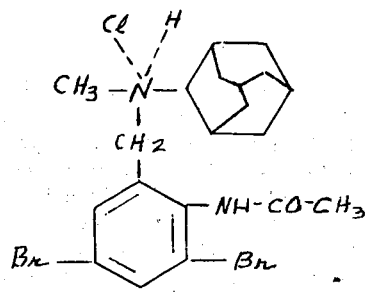

The procedure as set out in Example 1 was followed but the starting product was 4.30 g of 1-bromoethyl-3,6-dibromo,N-N-diacetyl-aniline and 1.650 g of N-methyladamantine.

The product which was thusly obtained, N-(3,5-dibromo-2-acetaminobenzyl)-N-methyladamantine hydrochloride is a crystalline white powder of M.W. 506.72 and M.P. (Köfler) 250–254°C. Maximum U.V. spectrum at 221 m$\mu$.

EXAMPLE 3

Preparation of
N-(3,5-diiodo-2-acetamino-benzyl)-
N-methyl-cyclohexylamine hydrochloride having the formula:

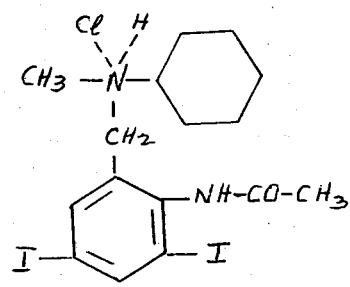

5.25 g of 1-bromomethyl-3,5-diiodo-N,N-diacetylaniline was reacted for 8 hours under reflux with 1.125 g of N-methyl-cyclohexylamine dissolved in 100 ml of absolute ethanol. The ethanol was then eliminated and the residue washed several times with ethyl ether to produce a solid which was then treated for 2 hours under reflux with 150 ml of 2N HCl. The mixture was cooled and kept in refrigerator at 4°C for 8–12 hours. The crystalline solid thus obtained was filtered and washed with abundant distilled water. The compound could be crystallized either in a mixture of ethanol-ether petroleum 1/1 (v/v) or in a mixture of acetic acid-water 1/1 (v/v).

The compound thus obtained, N-(3,5-diiodo-2-acetaminobenzyl)-N-methyl-cyclohexylamine hydrochloride is a crystalline white powder with M.W.: 548.62, M.P. (Köfler): 195°–198°C and Maximum UV Spectrum (in UVASOL-95) at 288 m$\mu$. Molar extinction ration E228 = 3.31 × 10$^4$.

The compounds according to the invention may be isolated and applied in the form of their acid addition salts with therapeutically acceptable acids, such as the inorganic acids, hydrochloric acid, sulphuric acid, hydrobromic acid and phosphoric acid, and organic acids, such as acetic acid, propionic acid, and substitution products, such as cyclohexyl propionic acid and phenyl propionic acid, tartaric acid, malic acid, citric acid, ascorbic acid, gluconic acid, mandelic acid, lactic acid, benzoic acid, fumaric acid, maleic acid, methane sulphonic acid, ethane sulphonic acid, succinic acid, aspartic acid, glutamic acid and sulfamic acid. The preferred acid is hydrochloric acid.

We claim:
1. A compound selected from the group consisting of a compound of the formula

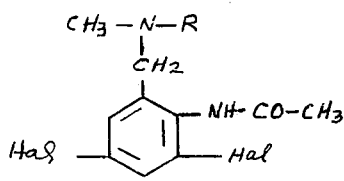

wherein Hal is halogen and R is an adamantyl or cyclohexyl group and the pharmaceutically acceptable non-toxic acid addition salts thereof.

2. A compound according to claim 1 wherein Hal is bromine or iodine.

3. A compound according to claim 1 in the form of its hydrochloric acid salt having the formula

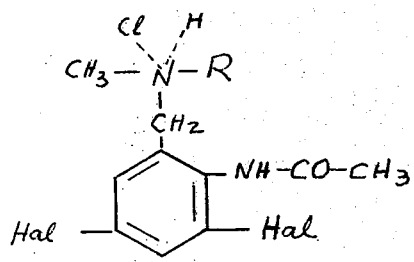

wherein Hal and R are as above defined.

4. A compound according to claim 1 designated N-(3,5-diiodo-2-acetaminobenzyl)-N-methylcyclohexylamine hydrochloride.

5. A compound according to claim 1 designated N-(3,5-diiodo-2-acetaminobenzyl)-N-methyladamantine hydrochloride.

6. A compound according to claim 1 designated N-(3,5-dibromo-2-acetaminobenzyl)-N-methyladamantine hydrochloride.

7. A process of making a compound according to claim 1 in the free base form comprising reacting 1-bromomethyl-3,5-dihalo-N,N-diacetylaniline with N-methyladamantine or N-nethylcyclohexylamine under reflux.

* * * * *